United States Patent
Dash et al.

(10) Patent No.: US 9,111,086 B2
(45) Date of Patent: Aug. 18, 2015

(54) SECURE MANAGEMENT OF USER RIGHTS DURING ACCESSING OF EXTERNAL SYSTEMS

(75) Inventors: Ajit Dash, Cupertino, CA (US); Ning Li, Burnaby, CA (US); Wolfgang Janzen, Mannheim (DE); Thomas Rinneberg, Schriesheim (DE)

(73) Assignee: SAP SE, Walldorf (DE)

( * ) Notice: Subject to any disclaimer, the term of this patent is extended or adjusted under 35 U.S.C. 154(b) by 533 days.

(21) Appl. No.: 13/089,273

(22) Filed: Apr. 18, 2011

(65) Prior Publication Data

US 2012/0266228 A1    Oct. 18, 2012

(51) Int. Cl.
G06F 7/04      (2006.01)
G06F 21/41     (2013.01)
H04L 29/06     (2006.01)

(52) U.S. Cl.
CPC ........ G06F 21/41 (2013.01); *G06F 2221/2141* (2013.01); *H04L 63/0815* (2013.01)

(58) Field of Classification Search
CPC ............................ G06F 21/41; H04L 63/0815
USPC ............................................................. 726/8
See application file for complete search history.

(56) References Cited

U.S. PATENT DOCUMENTS 6,158,007 A * 12/2000 Moreh et al. ...................... 726/1
2005/0154913 A1 * 7/2005 Barriga et al. ................. 713/201

OTHER PUBLICATIONS

SAP, SAP BusinessObjects User Management System 1.0, 2009, retrieved from the Internet, <URL: help.sap.com/businessobject/product_guides/boUMS01/en/FPM75_UMS_admin_en.pdf>, pp. 1-248.*

SNC, Secure Network Communications and Secure Store & Forward Mechanisms with the SAP R/3 System, 1997, Retrieved from the Internet <URL: stuff.mit.edu/afs/sipb/user/kolya/afs/root.afs/athena/project/its-alive/sap-docs/SNC-and-SSFM.pdf>, pp. 1-18 as printed.*

No stated author; Remote Function Call, Retrieved Nov. 2014; Retrieved from the Internet <URL: en.wikipedia.org/wiki/Remote_Function_Call>; pp. 1-2 as printed.*

* cited by examiner

*Primary Examiner* — Michael Chao
(74) *Attorney, Agent, or Firm* — Brake Hughes Bellerman LLP

(57) ABSTRACT

In an external system, a request handler may receive, at the external system, a logon ticket from a proprietary software system, the logon ticket associated with a request from a user of the proprietary system for access to the external system. A ticket handler may provide the logon ticket to an authentication service which is configured to perform a validation of the logon ticket at the proprietary system. A session manager may receive, from the authentication service and based on the validation, a user session and access rights related to the requested access. An access control manager may provide the requested access to the user via the proprietary system, according to the access rights and within the user session.

20 Claims, 11 Drawing Sheets

SECURE MANAGEMENT OF USER RIGHTS DURING ACCESSING OF EXTERNAL SYSTEMS

TECHNICAL FIELD

This description relates to providing access to external systems for users of a proprietary system.

BACKGROUND

Proprietary and/or otherwise specialized software systems have been implemented which provide a rich set of services within a particular realm or context. For example, proprietary business software exists which enables an enterprise to manage its customers, employees, financials, operations, and/or other business aspects in a highly efficient and productive manner.

Due to their highly-specialized and customized nature, it may be impractical or inefficient for such systems to provide additional or optional services which may go beyond the core competencies of the proprietary software. Instead, it may be desirable to provide users of the proprietary software with access to external systems which are themselves specifically designed to provide particular services. In this way, the users of the proprietary software may obtain the benefits of such external services, which may be complementary to, or otherwise useful in conjunction with, the functionalities of the proprietary software.

For example, in the context of the business software referenced above, it may occur that an enterprise installs and deploys a particular suite of business software. Meanwhile, external services also may be available which may be useful in conjunction with certain aspects of the business software suite. Users of the business software may thus be enabled to log on in a secured manner in the context of the business software, and thereafter interact with the external services from within that context. In this way, the users of the business software may integrate utilization of the external services in order to facilitate or supplement execution of tasks within the context of the business software.

SUMMARY

According to one general aspect, an external system may include instructions recorded on a computer-readable medium and executable by at least one processor. The system may include a request handler configured to cause the at least one processor to receive, at the external system, a logon ticket from a proprietary software system, the logon ticket associated with a request from a user of the proprietary system for access to the external system. The system may include a ticket handler configured to cause the at least one processor to provide the logon ticket to an authentication service which is configured to perform a validation of the logon ticket at the proprietary system. The system may include a session manager configured to cause the at least one processor to receive, from the authentication service and based on the validation, a user session and access rights related to the requested access. The system may include an access control manager configured to cause the at least one processor to provide the requested access to the user via the proprietary system, according to the access rights and within the user session.

According to another general aspect, a computer program product may be tangibly embodied on a computer-readable storage medium and may include instructions that, when executed, are configured to receive, at the external system, a logon ticket from a proprietary software system, the logon ticket associated with a request from a user of the proprietary system for access to the external system, and further configured to provide the logon ticket to an authentication service which is configured to perform a validation of the logon ticket at the proprietary system. The instructions, when executed, may be further configured to receive, from the authentication service and based on the validation, a user session and access rights related to the requested access, and provide the requested access to the user via the proprietary system, according to the access rights and within the user session.

According to another general aspect, a computer-implemented method may include receiving, at the external system, a logon ticket from a proprietary software system, the logon ticket associated with a request from a user of the proprietary system for access to the external system. The method may include providing the logon ticket to an authentication service which is configured to perform a validation of the logon ticket at the proprietary system, and receiving, from the authentication service and based on the validation, a user session and access rights related to the requested access. The requested access may be provided to the user via the proprietary system, according to the access rights and within the user session.

The details of one or more implementations are set forth in the accompanying drawings and the description below. Other features will be apparent from the description and drawings, and from the claims.

BRIEF DESCRIPTION OF THE DRAWINGS

FIG. 8 is a screenshot of a screen for configuring server security options.

FIG. 10 is a screenshot of a screen for modifying user rights for deleting objects in external systems.

DETAILED DESCRIPTION

Figure 1:
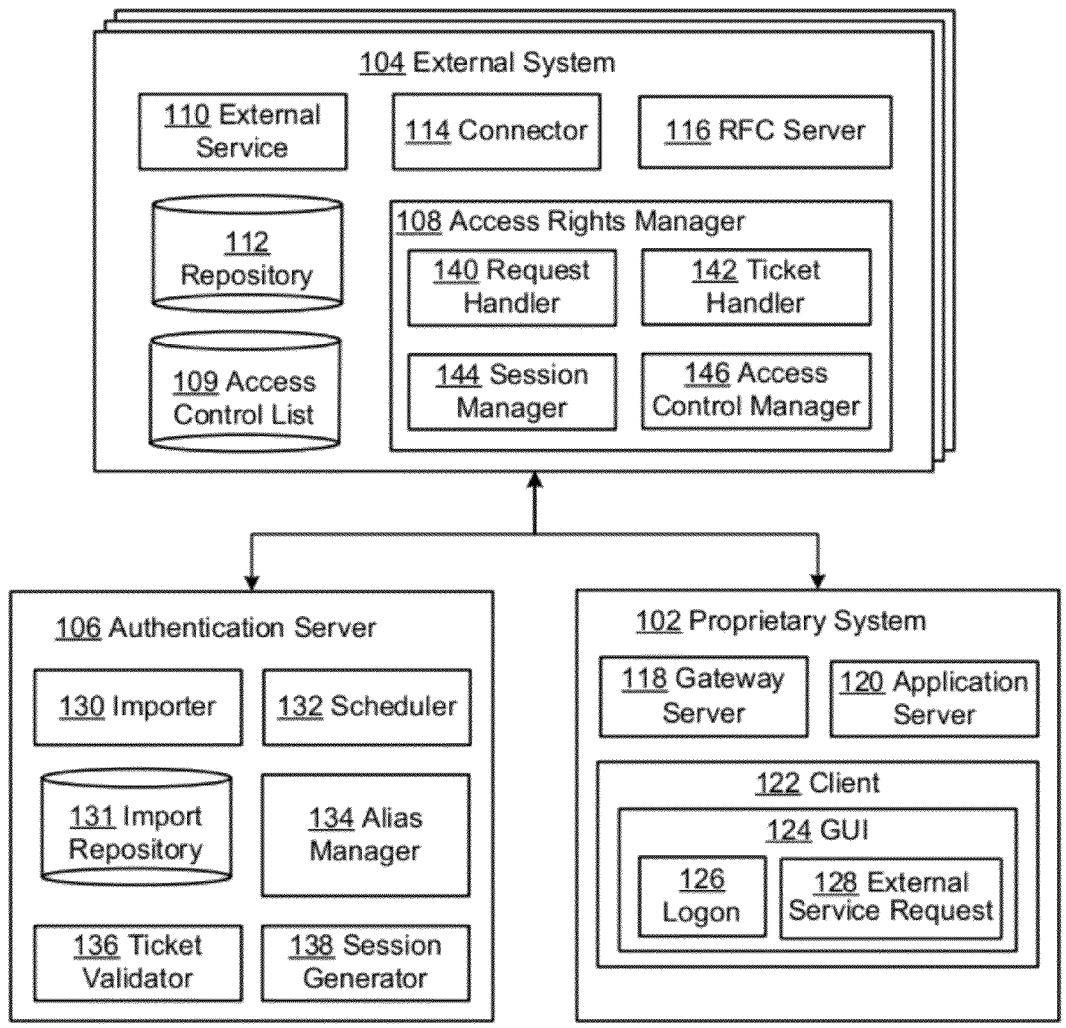
FIG. 1 is a block diagram of a system for providing secure management of user rights during accessing of external systems.

FIG. 1 is a block diagram of a system 100 for providing secure management of user access rights during accessing of external services by users of a proprietary system. Specifically, in the example of FIG. 1, a proprietary system 102 may generally represent virtually any self-contained, developer-specific, provider-specific, and/or otherwise highly customized or specialized software system which is designed and configured for deployment in a particular context or setting and for associated execution of functionality designed to satisfy particular needs of a user of the system 100 within that context.

For example, the proprietary system 102 may represent software products or software suites of a particular software provider, which has been configured for a deployment within the context of a particular purchasers or other customer or consumer of the software in question. In the examples provided herein, e.g., with respect to FIGS. 4-11, the proprietary system 102 may represent or include the business warehouse software provided by SAP AG of Walldorf, Germany. Of course, the proprietary system 102 may represent virtually any such similar software which may be provided by SAP AG or other existing or future providers of software-based enterprise solutions for businesses hoping to increase their productivity and/or efficiency (and thus their profitability and other performance metrics) through the use of such software. Of course, it will be appreciated that, in any case, these are merely examples, and that the proprietary system 102 may represent virtually any self-contained, internally-consistent software system which is provided by a software provider or other entity for use by a user of the proprietary system 102.

As referenced above, in general, it may be impractical or undesirable for the proprietary system 102 to provide various types of functionalities and features, e.g., functionalities and features which are outside of an area of expertise or specialty of the proprietary system 102. Rather, in order to provide such features and functionalities, the proprietary system 102 may utilize an external system 104 which is known to provide some or all of the desired features/functionalities. In this way, a user of the proprietary system 102 may have the benefit of using features and functionalities of the external system 104, without requiring significant cost that may be associated with modifying the proprietary system 102 to integrate or otherwise include the desired features/functionalities. Moreover, as illustrated in the example of FIG. 1, a plurality of the external systems 104 may be available to, or selected between by, a user of the proprietary system 102. Consequently, newly developed external systems also may be included for access and use by the proprietary system 102, even if such new versions of external systems were not available at a time of release of the proprietary system 102.

Thus, as referenced above and as described in more detail below, the user of the proprietary system 102 may authenticate him or herself to the proprietary system 102, e.g., by providing an appropriate username/password or other necessary credentials, and may thereby be granted access to the proprietary system 102. During such access, the user may request access to the external system 104, as well. For example, the user, logged into the proprietary 102 system, as just described, may select the external system 104 in order to obtain the benefit of a desired functionality thereof. In order to provide such benefit, the proprietary system 102 may communicate with the external system 104 to request the specified functionality.

Therefore, assuming for the sake of example that the external system 104 is compatible with the proprietary system for purposes of providing requested functionality, and further assuming that the external system 104 is configured to recognize the request from the proprietary system 102 as being received therefrom, then it may occur that the external system 104 is configured to act in accordance with a generated or previously generated agreement to provide requested services to the user of the proprietary system 102. In this context, however, it is apparent that the external system, just based on the connection request from the proprietary system 102, may have no way (by itself) to individually or separately authenticate, recognize, or otherwise interact with the logged-in user of the proprietary system 102.

In other words, from the perspective of the external system, it may be difficult, impractical, or impossible to differentiate between individuals or individual roles/titles/categories of users of the proprietary system 102, based solely on the request for services received from the proprietary system 102. As a result, when responding to a request for services or other functionalities from a user of the proprietary system 102, if presented only with the specific connection request from the user of the proprietary system 102, the external system 104 may be forced to respond equally or agnostically to all such user requests. Consequently, for example, users of the proprietary system 102 with a very high security level may be granted as much (or as little) access as users of the proprietary system 102 having a low level of security clearance or other access rights.

Moreover, in the event that the connection between the proprietary system 102 and the external system 104 is unsecure, it may occur that it is possible for an unauthorized user of the system 100 to obtain private or confidential information, using the request from the proprietary system 102 to the external system 104 for provision of services therefrom. While it may be possible to implement the external system 104 to perform an additional or alternative authorization or authentication of the user of the propriety system 102, such a solution may be impossible or impractical for a provider of the external system 104. For example, in cases where the external system is a relatively small or discrete software component, while the proprietary system 102 may be a very large, distributed software system, it may not be workable to expect the external system 104 to maintain and execute the necessary data and procedures associated with authenticating large numbers of users. Moreover, even in cases where the external system 104 may be configured to provide some level of separate authentication, it may be nonetheless difficult or impossible to coordinate such authenticated access at the external system 104 with respect to the previous, independent authenticated access provided at the proprietary system 102.

Accordingly, as described in detail below, any and all of the proprietary systems 102, the external system 104, and an authentication server 106 may be modified or otherwise configured to permit the external system 104 to interact with, (e.g., provide services to) the proprietary system 102, in a secure manner which also enables the external system 104 to manage access rights of users of the proprietary system 102 with respect to the external system 104, e.g., in a manner which is specific to, and takes into account, relevant security levels, clearances, or other access privileges of a particular user or group of users of the proprietary system 102. In this way, user access to the external system 104 from the proprietary system 102 may be regulated or otherwise managed so as to ensure that users of the proprietary system 102 are provided with only a permitted or desired type or level of access to the external system 104.

Moreover, the external system 104 may be enabled to benefit from such features, without requiring the external system 104 to maintain and execute actual authentications of users or groups of users of the proprietary system 102. That is, for example, the external system 104, in the example of FIG. 1, may not be required to maintain a full list of usernames and associated passwords of users of the proprietary system 102, or to execute the functionality of receiving such a username for authentication against a corresponding password. Consequently, for example, it may be straightforward for developers of external systems 104 to create lightweight, useful services, and to provide such services to the users of the proprietary system 102 even when a relatively large number of diverse external systems 104 are present for communication with, and use by, the proprietary system 102.

Thus, in the example of FIG. 1, the external system 104 may be configured, in conjunction with associated configurations of the proprietary system 102 and/or the authentication server 106, as described in detail herein, to leverage a presence and functionality of the authentication server 106 to thereby obtain the above, and other, features and advantages. For example, as described herein, the authentication server 106 may be utilized by the external system 104 to identify a current, logged in user of the proprietary system 102 (and/or an identity, role, category, security clearance, and/or other access-relevant information), as well as to create, enable, identify, or otherwise provide a user session that is associated with the external system 104 and synchronized with the corresponding user session of the logged in user at the proprietary system 102.

In order to interact with a requesting user of the proprietary system 102 in a manner which is appropriate to a type and level of access for the particular user, the external system 104 may be configured to include an access rights manager 108. As referenced above, and as described in detail herein, the access rights manager 108 may be configured to interact with the proprietary system 102 and the authentication server 106 in order to provide a unique session which is synchronized with a session of the user within the proprietary system 102, such that the user of the proprietary system 102 may be authenticated within the synchronized session provided by the access rights manager 108. Consequently, access rights granted to the user of a proprietary system may be provided in a secure, personalized, customized, or otherwise appropriate or desired fashion.

As generically illustrated in the simplified example of FIG. 1, the external system 104 may include and provide an external service 110, which may represent one or more functionalities or services that may be desired by the user of the proprietary system and that may be implemented to interact with the proprietary system 102. Additionally, or alternatively, the external system 104 may include a repository 112 that may include various types and amounts of data that may be utilized by the user of the proprietary system, e.g., in conjunction with utilization of the external service 110 and/or in conjunction with proprietary services of the proprietary system 102 itself.

Specific examples of the external service 110 and the repository 112 are provided below, e.g., in conjunction with FIGS. 4-11. For the sake of illustration and explanation in the context of FIG. 1, it may be appreciated by way of non-limiting example that the repository 112 may represent, e.g., a database which includes various types and amounts of data that the user of the proprietary system 102 may wish to access, while the external service 110 may represent associated database management functionality for providing such access. Consequently, in some examples, it may occur that the user of the proprietary system 102 has only limited access to the type of data stored in the repository 112. For example, a first user may be limited to read-only access of the data, while another user may have access rights which permit any type of deletion, modification, addition, or other manipulation of the data within the repository 112.

More generally, the external service 110 may represent virtually any type of software service that may be provided remotely over a computer network, and, similarly, the repository 112 may store any type of data that may be similarly accessed. Consequently, there may be a large number of widely varying types of services and data within a corresponding number of external systems that may be accessible by the proprietary system 102. Nonetheless, in the example of FIG. 1, the system 100 provides all such external systems 104 with the ability to provide user-appropriate types/levels of access to their respective services and/or data, without themselves having to provide actual authentication of such users, (e.g., without having to maintain entire lists of authenticated users, associated credentials, and associated functionality for providing authentication of a given user with respect to credentials received therefrom). As a result, it may be easier or more straightforward for developers of the external systems 104 to provide such systems to a variety of proprietary systems and associated users.

In the example of FIG. 1, it is assumed that the external service 110 and/or the repository 112 utilize various protocols, syntaxes, and/or semantics, and otherwise engage in operations in a manner which is unique to the external system 104, or, at least, is distinct from corresponding operations of the proprietary system 102. In other words, the external system 104 may execute in a manner which is proprietary to the provider of the external system 104, and therefore not necessarily compatible, by itself, with relevant operations of the proprietary system 102.

Consequently, a connector 114 may be implemented which may be configured to ensure compatibility between the proprietary system 102 and operations associated with the external service 110 and/or the repository 112. In this context, by themselves, such connectors are well known, and a number of examples of such connectors exist and would be known to one of skill in the art. Some specific examples of such connectors, provided merely for the sake of illustration, are also discussed in more detail, below.

Also with respect to the external system 104, a remote function call (RFC) server 116 is illustrated which may be configured to create and maintain a connection between the external system 104 and the proprietary system 102. Through the use of such RFC techniques, a suitable connection may be initiated and maintained between the proprietary system 102 and the external system 104, such that messages and other information exchanges there between may be conducted in a reliable, predictable manner. As with the connector 114, the RFC server 116, by itself and except as otherwise described herein, would be well known to one of skill in the art as one of a number of techniques available for implementing the type of communications needed between the proprietary system 102 and the external system 104 in order to provide functionality associated with the external service 110 and/or the repository 112 of the external system 104 to a user of the proprietary system 102.

As referenced above, however, in conventional settings, a connector such as the connector 114 and a RFC server such as the RFC server 116 may be used to provide the functionalities described above, and related functionalities, to any requesting, authorized, and/or authenticated user of the proprietary system 102. In other words, in conventional settings, once a user of the proprietary system has authenticated or otherwise logged in to the proprietary system 102, the user may proceed with obtaining functionalities related to the external service 110 and/or the repository 112. Since, in such conventional settings, the external system 104 has no knowledge of a particular identity, role, or security clearance/level of the requesting user, the external system 104 may proceed with providing virtually any available, relevant functionality to the requesting user. In practice, however, it may be undesirable to interact with users of the proprietary system 102 in this manner. For example, an administrator of either the proprietary system 102 and/or the external system 104 may wish to limit an access of a particular user or class of user with respect to available functionalities of the external service 110 and/or the repository 112.

As referenced above, the access rights manager 108 may interact with the proprietary system 102 and the authentication server 106 in order to utilize an access control list 109 which defines various types/levels of access rights of distinct users or classes of users, so as to thereby exert more control over whether, how, and to what extent such users are provided access to functionalities of the external service 110 and/or the repository 112. Moreover, as described, the access rights manager 108 may utilize the access control list 109 in a manner which provides the above-referenced features and advantages, without requiring the external system 104 or the authentication server 106 to maintain authentication credentials for all of the users of the proprietary system 102.

In the specific example of FIG. 1, for the sake of illustration and understanding, the proprietary system 102 is illustrated as including a gateway server 118, an application server 120, and a client 122. That is, although the proprietary system 102 is illustrated as a single component or module in the specific example of FIG. 1, it may be appreciated that, in fact, the proprietary system 102 may be a widely distributed system of components in communication with one another, which provides access to, and use of, the various proprietary features and functions of the proprietary system 102 to a potentially large and diverse pool of users.

For example, in a business context, a corporate headquarters may maintain the gateway server 118 and the application server 120, while numerous instances of the client 122 may be available to various employees and other stakeholders within, or associated with, the business in question. For example, an employee may utilize the client 122 to access the application server 120, and thereby obtain specific functionality from the application server 120. Specifically, for example, the application server 120 may provide numerous software modules or services, which may be used to compose a larger service that is tailored to a specific need of the user of the client 122 at that particular time.

Meanwhile, the gateway server 118 may represent one or more servers which are configured to enable and facilitate communications between the proprietary system 102 and other networks or other systems, e.g., the external system 104 and/or the authentication server 106. For example, the gateway server 118 may be configured to establish the RFC connection referenced above with the RFC server 116. The gateway server 118 may additionally or alternatively be configured to communicate with the connector 114 and the application server 120 to provide functionalities associated with the external service 110 and/or the repository 112 to the user of the client 122, perhaps in conjunction with related functionality provided by the application server 120.

In such example contexts, as illustrated, the client 122 may be associated with, or may provide, a graphical user interface (GUI) 124, which may be utilized by the user of the client 122 to interact with one or more of the gateway server 118, the application server 120, the external system 104 and/or the authentication server 106. In specific examples, the GUI 124 may represent a standard or customized browser application, or may represent a customized GUI which has been developed specifically for the provider and users of the proprietary system 102.

In practice then, from a perspective of a user of the proprietary system 102, the user may utilize the GUI 124 at a workstation or other computing device available to the user. For example, as illustrated, the user may utilize the GUI 124 to perform log on activities 126, such as, e.g., providing a username/password combination that is uniquely associated with the user for authentication to the proprietary system 102.

Once logged on using conventional authentication features of the proprietary system 102 (except as modified in the manner(s) described below), as also illustrated in the example of FIG. 1, the GUI 124 may be used to provide and facilitate an external service request 128, by way of which the now logged on user may request one or more functionalities associated with the external service 110 and/or the repository 112. To give a specific example, and continuing within the context of the business-related scenarios described above, it may occur that the user of the client 122 is a salesperson in an organization, and may log on to the proprietary system 102 in order to utilize various functionalities thereof related to management of customers or potential customers. In this context, the external service request 128 may be issued to the external system 104, which may, in the example, provide various functions and data related to customer management. Of course, these are merely examples, and within the business context the proprietary system 102 may implement virtually any business-related functionality, in conjunction with the external system 104, e.g., invoice management functionality, invoicing/financial-related functionality, human resources, or virtually any business-related functionality. Further, similar examples would be apparent during implementation of the proprietary system 102 in various other (e.g., non-business) contexts.

Thus, as described above, in conventional settings, the user of the client 122 may utilize the GUI 124 to execute a logon 126. In association with the logon 126, the proprietary system 102 may establish a session which is unique to the currently logged on user. Further, in response to selection of the external service request 128 by the user, the gateway server 118 may establish the RFC connection referenced above with the RFC server 116, and may thereafter utilize functionalities of the connector 114 to provide access to the external service 110 and/or the repository 112, perhaps in conjunction with related functionalities of the application server 120. In this way, as described, the user may utilize, and may benefit from, a set of functionalities and features which may otherwise be unavailable to the user purely within the context of the proprietary system 102 by itself.

As already described, however, in such conventional settings, the external system 104 permits and facilitates connections based on the remote function call of the gateway server 118, based only on the knowledge that the requesting user has been properly logged on, and authenticated by, the proprietary system 102. For example, the external system 104 may have knowledge that the gateway server 118 or other suitable component may maintain a list of all users in their associated roles who have been provided with authentication credentials for accessing a proprietary system 102, and that the gateway server 118 or other suitable component has in fact performed the related functionality of verifying the authentication credentials of the requesting user against the corresponding entry within the entirety of the list of users of the proprietary system 102. However, the external system 104, in conventional settings, is not provided with any further information regarding specific access rights of the user in question, relative to a role or category of the user and/or relative users of the proprietary system 102.

In the example of FIG. 1, the access rights manager 108 leverages functionality of the authentication server 106 to provide access rights management at the level of a specific user and/or class of users. In order to enable such functionality of the access rights manager 108, the authentication server 106 may include an importer 130 which may be configured to recognize the proprietary system 102 and to communicate with the proprietary system 102 to import all user roles within the proprietary system 102 which may be relevant to, e.g., which may possibly wish to request services of, the external system 104. In some examples, the importer 130 also may import all users associated with the imported roles. In the example(s), then, the importer 130 is not required to import all of the users of the proprietary system 102, such as, e.g., may be maintained by the gateway server 118 as just described. Rather, the importer 130 may simply import specific roles or other categories of users which may potentially request access to the external system 104, and may enable access rights management of the access rights manager 108 based on such roles. Consequently, and advantageously, the importer 130 may be required to import and maintain a significantly smaller number of roles/users, as compared to the entire list of users maintained by the proprietary system 102 itself.

Moreover, inasmuch as the access rights management techniques described herein are maintained with respect to such user roles, it may be appreciated that individual users associated with each such role may be modified with little or no effect on the role-based access rights management. For example, a scheduler 132 may be configured to maintain a list of users of the proprietary system 102 in conjunction with each role imported by the importer 130. Over time, the scheduler 132 may perform updates of the users associated with each role. For example, new employees may be hired by providers of the proprietary system 102, and may need to be added to corresponding roles within the organization. On the other hand, employees may depart the organization over time, in which case the scheduler 132 may be configured to delete departed users from their association with one or more relevant roles.

In the example of FIG. 1, an import repository 131 is illustrated in which the various roles may be stored in association with their respective imported users and other information. Consequently, it may be appreciated that the scheduler 132 may be configured to perform updates of the users with respect to the imported roles, in the manner just described, by performing such (e.g., periodic) updates of the import repository 131.

During importing of the various roles and associated users of the proprietary system 102, the usernames of the various users may be imported by the importer 130. In practice, an alias manager 134 may be configured to associate an alias assigned by the authentication server 106 to each such user, and the import repository 131 may be organized and maintained with respect to the thus-provided aliases. Specific examples of use of such aliases are provided below, e.g., with respect to examples of FIGS. 4-11.

In the example of FIG. 1, in conjunction with the logon 126 as described above, a user session for the logged on user of the proprietary system 102 may be generated. Specifically, during the logon process, the gateway server 118 or other appropriate component involved in the login/authentication process, may generate a ticket which is uniquely associated with the created session. Such a ticket, by itself, is well known, and may include or be referred to as, e.g., a single sign on (SSO) ticket, an assertion ticket, or a logon ticket. In conventional contexts, such tickets may be used as a convenience for the user of a proprietary system 102. For example, such tickets may be used to enable the user of the proprietary system 102 to execute a single logon process, and thereafter gain access to separate systems which require authentication, based on information contained within the ticket, and without requiring the individual user to execute a logon process with the separate system in question.

In the context of FIG. 1, such a ticket may be utilized in a unique and novel fashion, so as to enable the type of access rights management described above. Specifically, the ticket may be provided to the access rights manager 108, which may share the ticket with a ticket validator 136 of the authentication server 106. The ticket validator 136 may utilize the ticket to ascertain and validate an identity (e.g., an associated role) of the relevant user. For example, the ticket validator 136 may use the ticket to logon to the proprietary system 102, and, by virtue of a success of such a logon procedure, may validate and determine an identity of the user in question.

Thereafter, a session generator 138 may utilize information stored within the import repository 131 to generate a session which corresponds to the already-created session of the user within the proprietary system 102, and, moreover, enables the access rights manager 108 to synchronize the session generated by the session generator 138 with the already-existing session of a proprietary system 102. In conjunction with information associated with the use and synchronization of these sessions, the access rights manager 108 may be enabled to compare a role that is identified and provided by the authentication server 106 with respect to corresponding roles within the access control list 109. Consequently, the access rights manager 108 may be configured to provide an appropriate level of access, as defined by the access control list 109, within the synchronized user sessions. In this way, as described, the access rights manager 108 may be enabled to provide appropriate levels of access to users of the proprietary system 102, without being required to perform authentication of the users of the proprietary system 102.

In order to implement the above described functionality, the access rights manager 108 of the external system 104 may include a request handler 140 which may be configured to receive a request from the proprietary system to utilize the external service 110 and/or the repository 112, wherein the request may be received in response to selection of the external service request 128 for providing over a network connection established by the RFC server 116. Further, a ticket handler 142 may be configured to receive the above referenced logon ticket from the proprietary system 102, and to thereafter forward the logon ticket to the ticket validator 136 of the authentication server 106.

With the above described presumption that the authentication server 106 has already imported relevant roles and associated users of the proprietary system 102 for storage within the import repository 131, the ticket validator 136 may proceed to utilize the logon ticket to log on to the proprietary system 102, and thereby identify the user and associated user session for validation thereof.

In example implementations of the system 100, the logon ticket may have a relatively short lifetime that is defined by the gateway server 118 or other appropriate component which generates and configures the logon ticket. Therefore, it is assumed for the sake of the example of FIG. 1 that the ticket validator 136 performs validation of the user of the proprietary system 102 and associated session and role information within a lifetime of the logon ticket, e.g., 2 minutes or other appropriately-designed lifetime.

The session generator 138 may thus provide a session manager 144 of the access rights manager 108 of the external system 104 with information to establish a user session for the user that is associated with the external system 104, and that is synchronized with the user session within the proprietary system 102. For example, due to the relatively limited lifetime of the logon ticket, the session manager 144 may be configured to cache or otherwise store session credential information for the session to be provided and synchronized with the session of the user within the proprietary system 102. Thus, in the context of the creation and implementation of the synchronized session by the session manager 144, an access control manager 146 may interact with the access control list 109 to provide a level of access to the user and within the synchronized session in a manner which is in accordance with the access control list 109.

Figure 2:
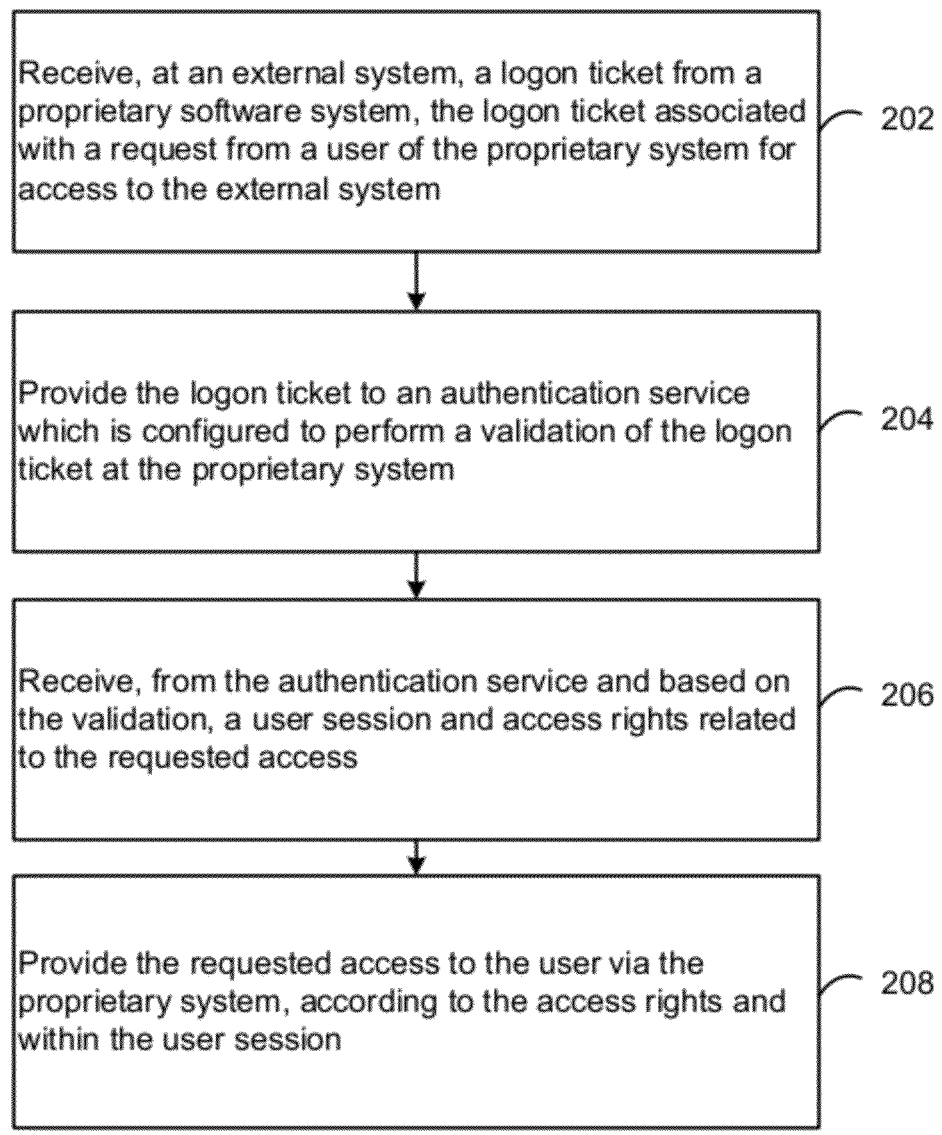
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as discrete operations which occur in a sequential order. However, it may be appreciated that in other implementations, two or more of the operations 202-208 may occur in a partially or completely overlapping or parallel manner, or in a nested or looped manner, or may occur in a different order than that shown. Moreover, additional operations, not specifically illustrated in the example of FIG. 2, also may be included in some implementations, while, in other implementations, one or more of the operations 202-208 may be omitted.

As described below, the operations 202-208 generally provide a simplified operational flow which may be enacted by the external system 104, e.g., the access rights manager 108, in order to provide the features and functionalities described above with respect to FIG. 1. Thus, in the example of FIG. 2, a logon ticket may be received from a proprietary system at an external system, where the logon ticket may be associated with a request from a user of the proprietary system for access to the external system (202). For example, the request handler 140 may be configured to receive the logon ticket from a user of the proprietary system 102, in conjunction with the logon 126 of the user.

The logon ticket may be provided to an authentication service which is configured to perform a validation of the logon ticket at the proprietary system (204). For example, the ticket handler 142 may be configured to forward the logon ticket to the ticket validator 136 of the authentication server 106. As may be understood from the above examples of FIG. 1, it is presumed for the example of FIG. 2 that the authentication server 106 has previously imported, e.g., using the importer 130, all appropriate roles and associated user information associated with the proprietary system 102 that may be potentially relevant for the external system 104, for storage within the import repository 131. Consequently, the ticket validator 136 may be configured to submit the logon ticket to the proprietary system 102, during a lifetime of the logon ticket, and thereby logon to the proprietary system 102 to identify and validate the authenticated user of the proprietary system 102 as such.

A user session and access rights related to the requested access may be received from the authentication service and based on the validation (206). For example, the session manager 144 may receive identification of a session of the user within the proprietary system 102, as well as session information for creating and maintaining a synchronized user session for the user within the external system 104. As described above, such session information may be received from the session generator 138 of the authentication server 106. As may be appreciated, the relevant session information may include the validated identity and role of the authenticated user, which may thereafter be used by the access rights manager 108 in configuring and providing the synchronized session within the external system 104.

Specifically, the requested access may be provided to the user via the proprietary system, according to the access rights and within the user session (208). For example, the access control manager 146 may be configured to utilize the access control list 109 to compare user roles and other access information stored therein with the role or session information received from the session generator 138 of the authentication server 106. In this way, features and functionality associated with the external service 110 and/or the repository 112 may be provided to the user of the proprietary system 102 in a manner that is appropriate to an access level and access rights of the user, and may be thus provided by way of the user of the GUI 124 of the client 122 of the proprietary system 102 (and thus, in a manner which is convenient to the user of the proprietary system 102 and consistent with other functionalities of the proprietary system 102 provided thereby).

Figure 3:
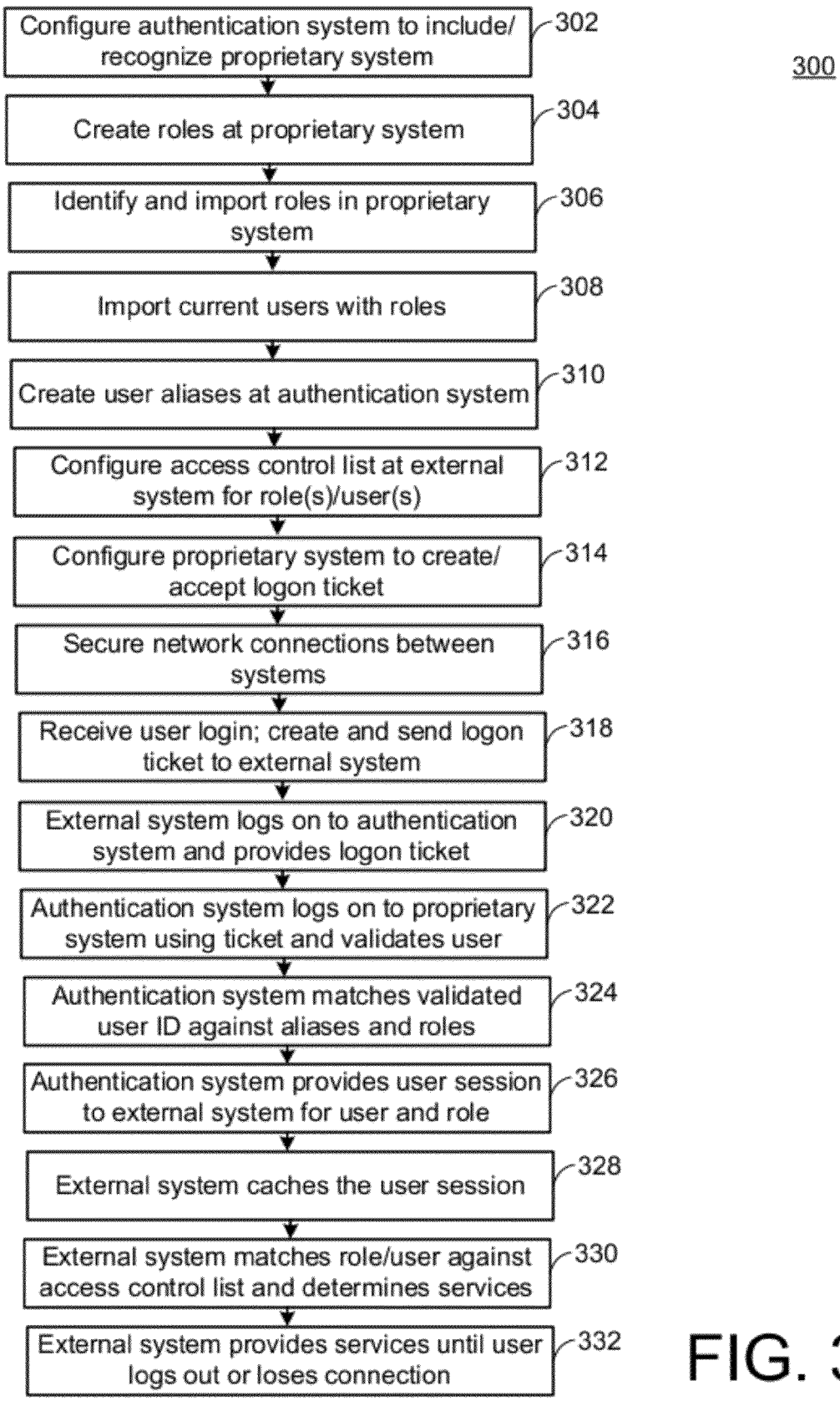
FIG. 3 is a flowchart illustrating more detailed example operations of the system of FIG. 1.

FIG. 3 is a flowchart 300 illustrating more detailed example operations of the system 100 of FIG. 1. In the example of FIG. 3, an authentication system of the authentication server 106 may be configured to include and/or recognize the proprietary system 102 (302). For example, the authentication server 106 may be configured to recognize and store certain features and aspects of the proprietary system 102, including, for example, necessary protocols for communicating with the proprietary system 102.

Based on the recognition of the proprietary system 102 by the authentication server 106, the authentication server 106 may be configured to define a number of roles of users of the proprietary system that may be relevant for managing access rights of the users with respect to the external system 104 (304). For example, the importer 130 may initially be configured to define and include such roles.

Consequently, based on the roles, the importer 130 may be configured to identify and import corresponding roles from within the proprietary system 102 (306). As just referenced, such role implementation may include only those roles which may be relevant to use of the external system 104 by users of the proprietary system 102, and need not include all the roles associated with users within the proprietary system 102.

Thereafter, the importer 130 may proceed with importing current users of the proprietary system 102 which are currently associated with the previously defined imported roles (308). Again, it may be noted that the imported users currently associated with the roles may represent only a subset of the entirety of users defined for the proprietary system 102.

The alias manager 134 may create user aliases for the imported users at the authentication system (310). In this way, for example, the roles/users may be uniquely tracked and maintained within the import repository 131 with respect to the proprietary system 102 and the external system 104.

Meanwhile, at the external system 104, the access control list 109 may be configured for relevant roles and associated users (312). For example, the access rights manager 108, e.g., the access control manager 146, may configure the access control list 109 to include a listing or other categorization of the plurality of relevant roles, associated with corresponding access rights permitted on association therewith. For example, in the case where the repository 112 includes a database, a first role may be associated with read-only access to the database, while the second role may be provided with a level of access necessary to perform modifications and/or deletions of data within the database.

The proprietary system 102, e.g., the gateway server 118, may be configured to create and accept logon tickets (314). In this regard, it may be appreciated that it is feasible, but not required, during normal or conventional operations of the proprietary system 102 to generate and otherwise utilize such logon tickets. Nonetheless, as referenced above, various examples and instances of such logon tickets, by themselves, are well known in the art in other contexts, such that such existing logon ticket generation techniques may simply be appropriately configured for use in the context of the system 100 of FIG. 1.

In the example of FIG. 3, a network connection between the proprietary system 102 and the external system 104 may be established in a secured manner, and associated with a unique connection ID (316). For example, the gateway server 118 may be configured to communicate with the RFC server 116 to configure a secure network connection for establishing and conducting associated remote function calls. In this regard, it may be appreciated that conventional communications between the proprietary system 102 and the RFC server 116 may be configured to exchange information according to standard, non-secured network communication protocols (e.g., the transmission control protocol/internet protocol (TCP/IP) communication techniques). However, such non-secured connections for conducting remote function calls may be undesirable or not permitted in the context of the system 100 of FIG. 1, e.g., due to the exchange of the logon ticket between the proprietary system 102 and the external system 104, as described herein. In specific examples, as described below, the network connections may be secured and associated with a unique connection ID using the secured network communications (SNC) protocol.

Subsequently, at the proprietary system 102, the user logon may be received and the corresponding logon ticket may be created and sent to the external system, over the secure connection and in conjunction with the unique connection ID (318). The external system 104 may thereafter log on to, or otherwise establish communications with, the authentication server 106, and may provide the logon ticket and connection ID to the authentication server (320). For example, the ticket handler 142 may provide the logon ticket and connection ID to the ticket validator 136 of the authentication server 106. Thereafter, the authentication system 106, e.g., the ticket validator 136, may log on to the proprietary system 102 using the logon ticket and unique connection ID, and may thereby identify and validate the user as an authenticated user of the proprietary system 102 (322).

The authentication server 106, e.g., the ticket validator 136, may proceed to match the validated user ID against user aliases and roles stored within the import repository 131 (324). Based on such matching, the session generator 138 may provide a user session to the external system 104 which is associated with the validated user in the associated role (326).

Due to the limited lifetime of the logon ticket, the external system 104 may be configured to cache the user session in conjunction with synchronizing the user session with the user session of the user within the proprietary system 102, e.g., using a unique conversation ID which is managed by the session manager 144 of the external system 104 (328). Subsequently, the external system 104, e.g., the access control manager 146, may match the validated user and associated role within the thus-created user session against the access control list 109, to thereby determine access rights of the user relative to providing of features and functionalities associated with the external service 110 and/or repository 112 (330). Consequently, the external system 104 may be thus configured to provide such services within the synchronized sessions until such time that the user of the proprietary system 102 logs out of the proprietary system 102 or otherwise loses the connection between the proprietary system 102 and the external system 104.

Figure 4:
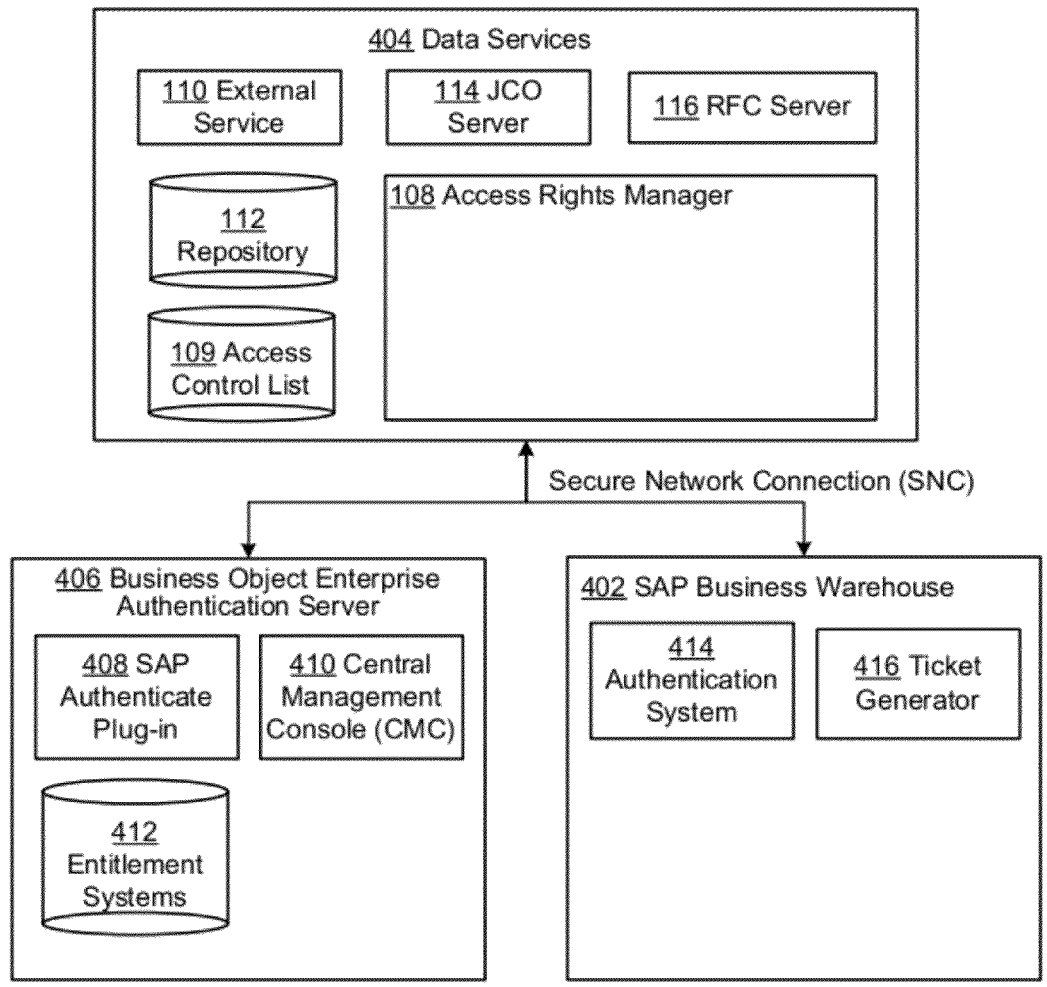
FIG. 4 is a block diagram of a specific example implementation of the system of FIG. 1.

FIG. 4 is a block diagram of a system 400 illustrating a specific example of the system 100 of FIG. 1. Specifically, as shown and described, the system 400 may relate to, and/or utilize, various business enterprise services and platforms provided by, or in association with, business software provided by SAP AG of Waldorf, Germany.

For example, the proprietary system 102 of FIG. 1 may be represented by the SAP business warehouse software system 402 in FIG. 4. Meanwhile, the external system 104 of FIG. 1 may be represented by data services software 404 of FIG. 4. Further, the authentication server 106 of FIG. 1 may be provided by, or in conjunction with, a BusinessObjects Enterprise (BOE) authentication server 406.

The SAP business warehouse 402 and associated data services 406 are, by themselves, well known in the art for providing services and functionality related, e.g., to databases and database management tools that are used to support management decision making, e.g., data extractors, analysis and report tools, and business process models. As such, they are not described herein in further detail except as may be necessary or helpful in understanding operations of the system 400 of FIG. 4. Meanwhile, Business Object Enterprise may generally refer to a service oriented architecture (SOA) provided by SAP AG which provides a plurality of potentially inter-connected services, which provides a flexible and scalable information infrastructure that makes it easy to discover and share insight for optimal decision making BOE thus offers an extensive set of solutions on a single platform.

It may be appreciated from the illustration of FIG. 4 that any of the systems 402, 404, 406 may include some or all of the various components illustrated and described with respect to respective systems 102, 104, 106 of FIG. 1. However, for the sake of clarity and convenience, not all such components are illustrated with respect to FIG. 4. Rather, as shown, FIG. 4 illustrates the access rights manager 108 and associated access control list 109, in conjunction with various components illustrating specific instances of, or modified or specific versions of, corresponding components from within the example of FIG. 1.

For example, in the context of FIG. 4, the external service 110 and the repository 112 may be understood to represent various services and repositories provided by, or in association with, data services conventionally provided to interact with the SAP business warehouse 102, e.g., enterprise-class solution(s) for data integration, data quality, data profiling, and text analysis that enables integration, transformation, improvements, and delivery of trusted data, and thereby supports critical business processes and enables sound decisions.

Meanwhile, the connector 114 is illustrated as a Java connector (JCO) server. In this context, it would be appreciated by one of skill in the art that the java connector, (or JCO) is a well known type of connector which may be used in providing services or other functions of data services with or to the SAP business warehouse 402. Further with respect to the data services external system 404, the RFC server 116 may be configured to establish a connection with the SAP business warehouse 402 using remote function calls, wherein the connection may be secured through the use of the secure network connection (SNC) protocol provided and implemented by SAP AG.

As further illustrated in the example of FIG. 4, the business object enterprise authentication server 406 may include, or implement, the SAP authentication plug-in 408, a central management console 410, and a repository 412 of entitlement systems that are configured to be recognized and communicated with by the business object enterprise (BOE) authentication server 406. Again, it may be appreciated that the components 408, 410, 412 may represent some or all of various ones of the components of the authentication server 106 of FIG. 1. Specific functionality and uses of the components 408, 410, 412 in the example of FIG. 4 and in implementing the various functionalities of the authentication server 106 described with respect to FIG. 1, are provided in detail below, e.g., with respect to FIGS. 5-11.

Finally in the example of FIG. 4, the SAP business warehouse 402 is illustrated as including an authentication system 414 and a ticket generator 416. Although the components 414, 416 are illustrated separately, it may be appreciated that generation of the logon ticket as described herein by the ticket generator 416 may be executed in conjunction with operations of the authentication system 414. For example, as described, during a user logon of a user of the SAP business warehouse 402, the authentication system 414 may match received authentication credentials of the user against a database of authentication credentials of all registered users of the SAP business warehouse 402, and provide authentication based thereon. In conjunction with such authentication, the ticket generator 416 may generate the described logon ticket to be provided to the data services 404, and ultimately to the BOE authentication server 406.

Specific operations of the systems 402, 404, 406, analogous to operations of the above-described flowcharts 200, 300 of respective FIGS. 2, 3 are provided below with respect to the operational flow illustrated in the example of FIG. 5.

Figure 5:
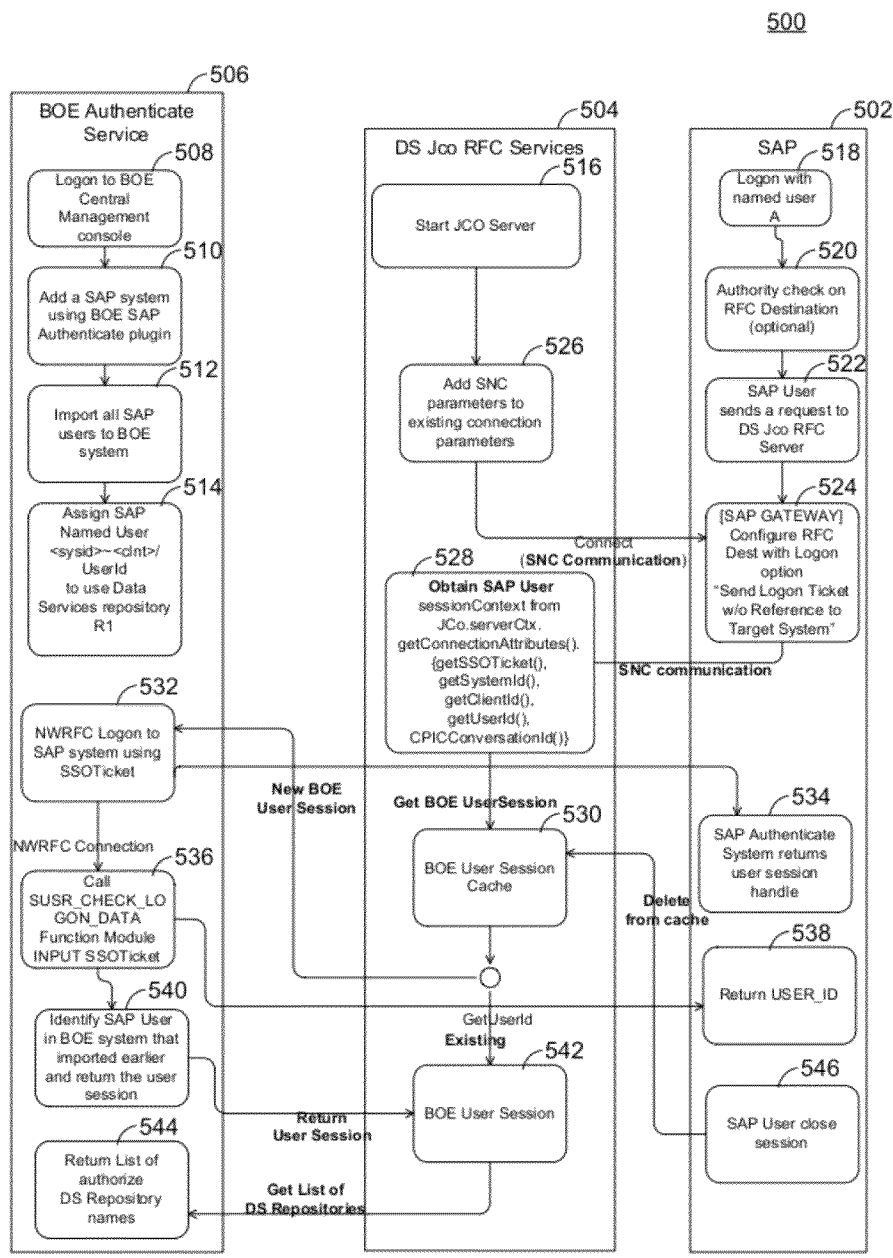
FIG. 5 is a flowchart illustrating detailed example operations of the system of FIG. 4.

Specifically, in the example of FIG. 5, actions of the SAP Business Warehouse are illustrated in box 502, while actions of the Data Services (DS) JCo/RFC services 404 are illustrated in box 504, and actions of the BOE authentication server/services are illustrated in box 506. In the example of FIG. 5, it is assumed that an administrator of the Business Warehouse 402 has created a Data Service role therein.

Figure 6:
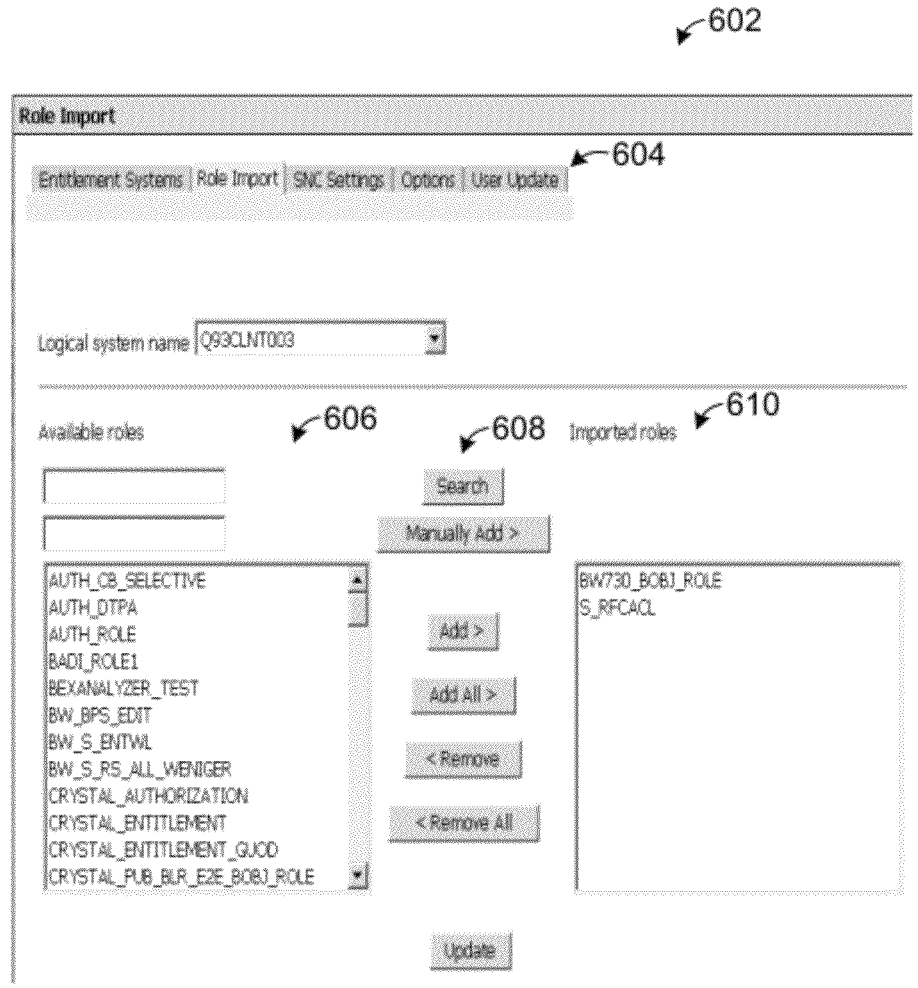
FIG. 6 is a screenshot of a screen for importing user roles from a proprietary system into an authentication system.

Then, the Administrator may login to the BOE Central Management Console (CMC) (508) to access CMC→authentication→SAP page. The administrator may then add the Business Warehouse system 402 as an entitlement system (assuming it does not already exist as such). Then the administrator may import the SAP Data Services role and its corresponding SAP users (512), and assign a UserIDs as aliases for the named user(s) to use the Data Services repository (e.g., the repository 112) (514). FIG. 6 illustrates an example screenshot 602 of the role importation process, in which "role import" is selected from tabs 604 to display available roles 606, from which buttons 608 may be used to select roles for importation, as shown in portion 610.

Figure 7:
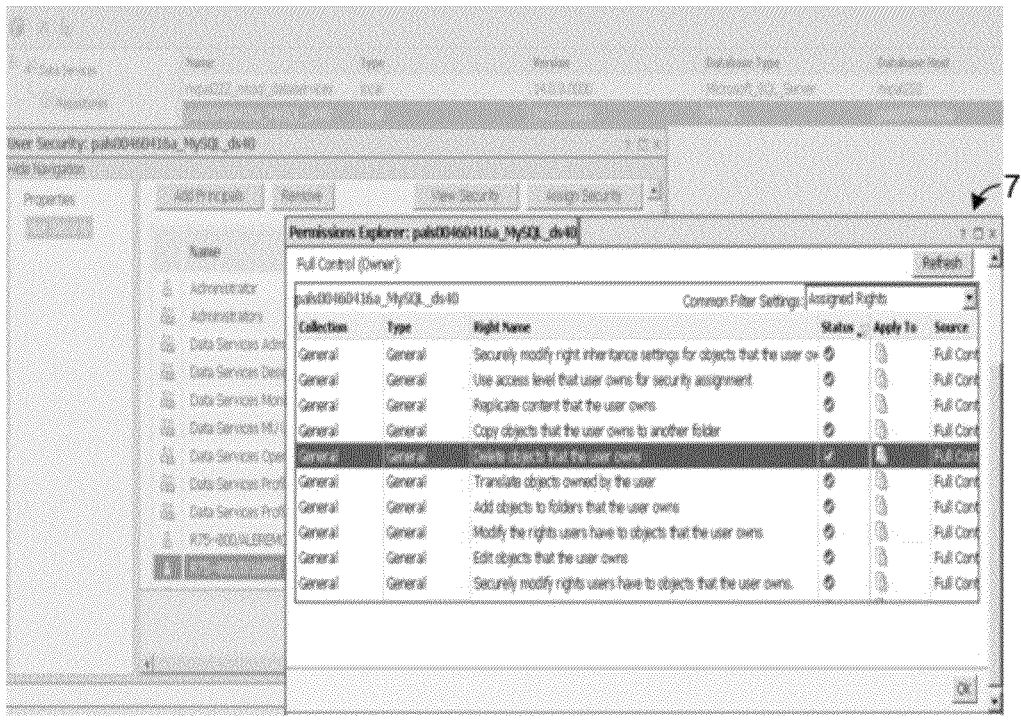
FIG. 7 is a screenshot of a screen for configuring user rights for accessing external systems.

Once a Business Warehouse user is imported to the BOE system 406, the administrator may configure a Data Services repository and Data Services Application User Security to assign appropriate rights, and to thereby create or modify the ACL 109. FIG. 7 illustrates an example screenshot 702 in which a window 704 illustrates a number of possible rights levels, including a selected level of being authorized to "delete objects that the user owns," as shown.

The Administrator may configure the Data Services RFC Server 116 to enable the ACL check described above with respect to the access rights manager 108 (i.e., portions of the access rights manager 108 may be implemented within the RFC server 116). In conjunction with this enablement of the ACL Check, the Data Services RFC Server 116 may proceed to implement a Security Handler associated with the JCo server 114, including starting the JCo server (516). That is, again, portions of the access rights manager 108 may be implemented within the JCo server 114. Specifically, such a Security Handler may be invoked by a JCo library of the JCo server 114, for every function call from the Business Warehouse 402 to the Data Services RFC Server 116. The JCo Security Handler may be used to check whether the user who has logged in (518, perhaps in conjunction with an authority check on the RFC destination of the RFC server 116 (520)), and who has initiated the RFC function call (522) has also sent the (SSO) Logon ticket (524) (otherwise, the RFC Server 116 may provide notification of an error). In order to execute the above, as referenced, an administrator of the Business Warehouse 402 may configure the authentication system 414 to use logon tickets, i.e., may enable the ticket generator 416. In the example of FIGS. 4 and 5, the logon ticket may be configured to send the log on ticket without reference to a target system," as shown.

In order to encrypt the logon ticket during RFC communication between Business Warehouse 402 and the RFC Server 116, the administrator may enable SNC and provide the RFC Server with a corresponding SNC name, SNC library path and name, and SNC quality of protection, which allows the addition of SNC parameters to existing connection parameters (526). Then, the JCo server 114 may obtain the SAP user session context, including connection attributes, SSO/logon ticket, systemID, ClientID, UserID, and ConversationID (528).

As described, one of the properties of a log on ticket is that it typically expires after two minutes or other designated, relatively brief amount of time. However, a typical user session in the Business Warehouse 402 is a stateful session. In other words, the above-referenced JCo library may maintain the SAP user session/internal mode, from the very first time the user sends a function call request to the Data Services RFC Server 116. During that call, the Business Warehouse system 402 may send a new log on ticket. Subsequent function calls in the same user session/internal mode would therefore not send a logon ticket. Rather, as the above-referenced JCo library maintains the SAP user session/internal mode, it may deliver the same log on ticket.

If the user session lasts more than 2 minutes (which is frequent), the logon ticket delivered by the JCo library would already be expired. As a result, the RFC server 116 will be unable to use the expired logon ticket to logon to BOE system in order to obtain user's BOE enterprise session. Therefore, the RFC Server 116 may obtain the SAP user's BOE logon enterprise session in the JCo Security Handler, the very first time the SAP user's stateful session is established, and thereafter may cache this session object (530).

The Net Weaver RFC (NWRFC) logon to the Business Warehouse 402 may be executed using the log on ticket (532), so that the Business Warehouse system 402 authenticates the logon ticket and returns the user's session handle (534). The BOE Software Development Kit (SDK) enterprise user logon API may be used to login to the Business Warehouse system 402 using the log on ticket (536), whereupon it may match the SAP userID that it obtains from the Business Warehouse system 402 (538) with the previously-imported SAP Users aliases. If it finds a match then it returns the SAP user BOE enterprise session object (540).

Thereafter, the SAP user's BOE enterprise session is uniquely identified in the RFC Server 116 (544), e.g., by <SysID>~<CLNT>/userid/CPICConversationID, where such an ID corresponds to the SAP User session in the SAP Business Warehouse system. In conjunction with the user session, the BOE system may return the list of authorized DS repository names (544), so that an appropriate level of access may be provided to the user during execution of the synchronized sessions of the RFC server 116 and the Business Warehouse 402.

When the user switches to another transaction within a logon session, or executes a logout process, or if there is a network communication error, the JCo server 114 may close the user session (546). The RFC Server 116 may then logout from the BOE user enterprise session and remove the session from its session cache. Below picture depicts RFC Server security options.

Figure 8:
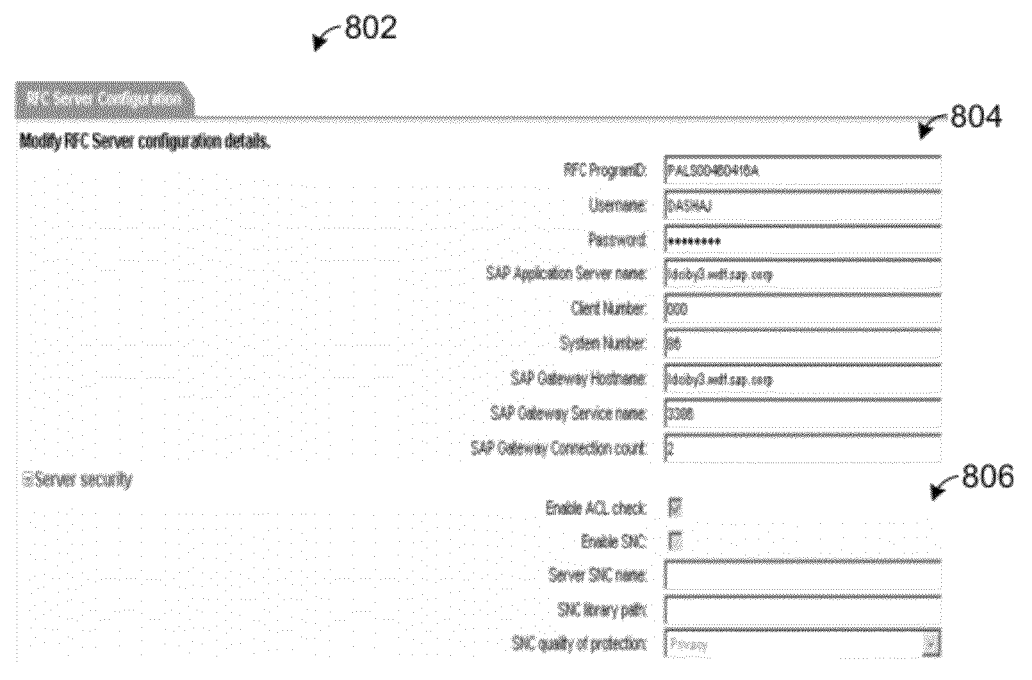

In conjunction with the above, FIG. 8 illustrates a screenshot 802 with which an administrator of the RFC server 116 may perform configurations. As shown, in a section 804, the administrator may identify relevant Gateway and application servers (e.g., 118, 124), as well as related connection information. In a section 806, a checkbox is illustrated for enabling use of the ACL 109, and a checkbox and related fields are illustrated for enabling and configured the SNC parameters.

Figure 9:
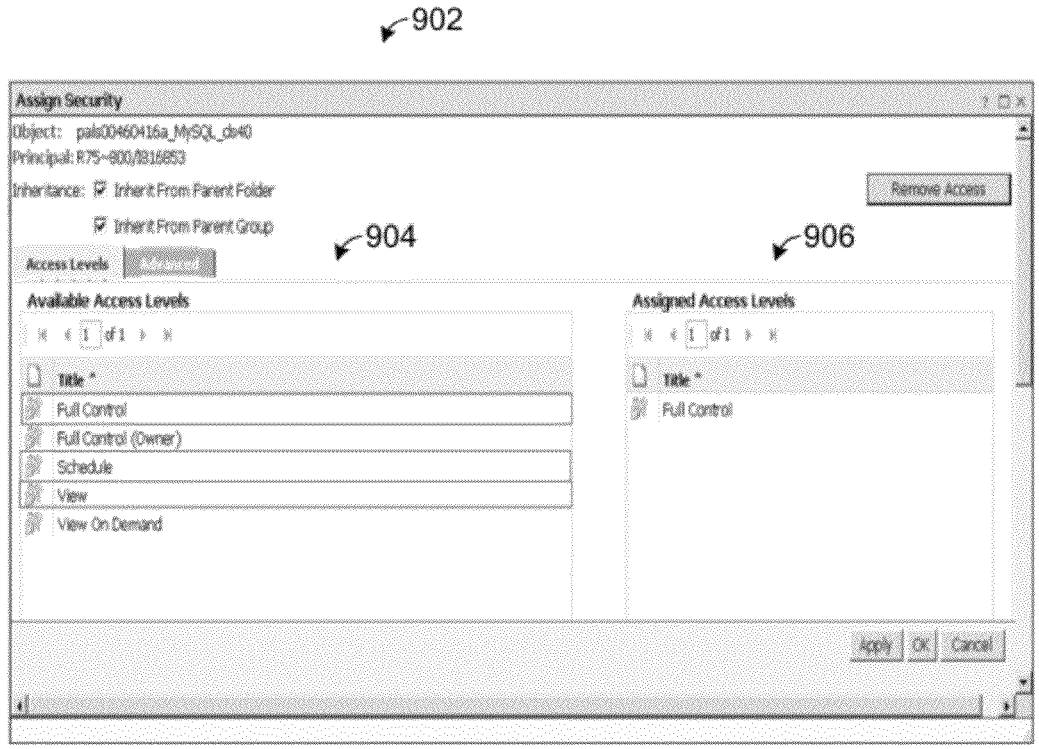
FIG. 9 is a screenshot of a screen for configuring access levels.

FIG. 9 is screenshot 902 illustrating how the data services 404 uses BOE authorization rights for Business Warehouse security. Specifically, a section 904 illustrates a number of system access levels, e.g., full control access levels, view control access levels, and schedule control access levels. A section 906 is used to illustrate selected, assigned access levels for a user, e.g., full control access.

Figure 10:
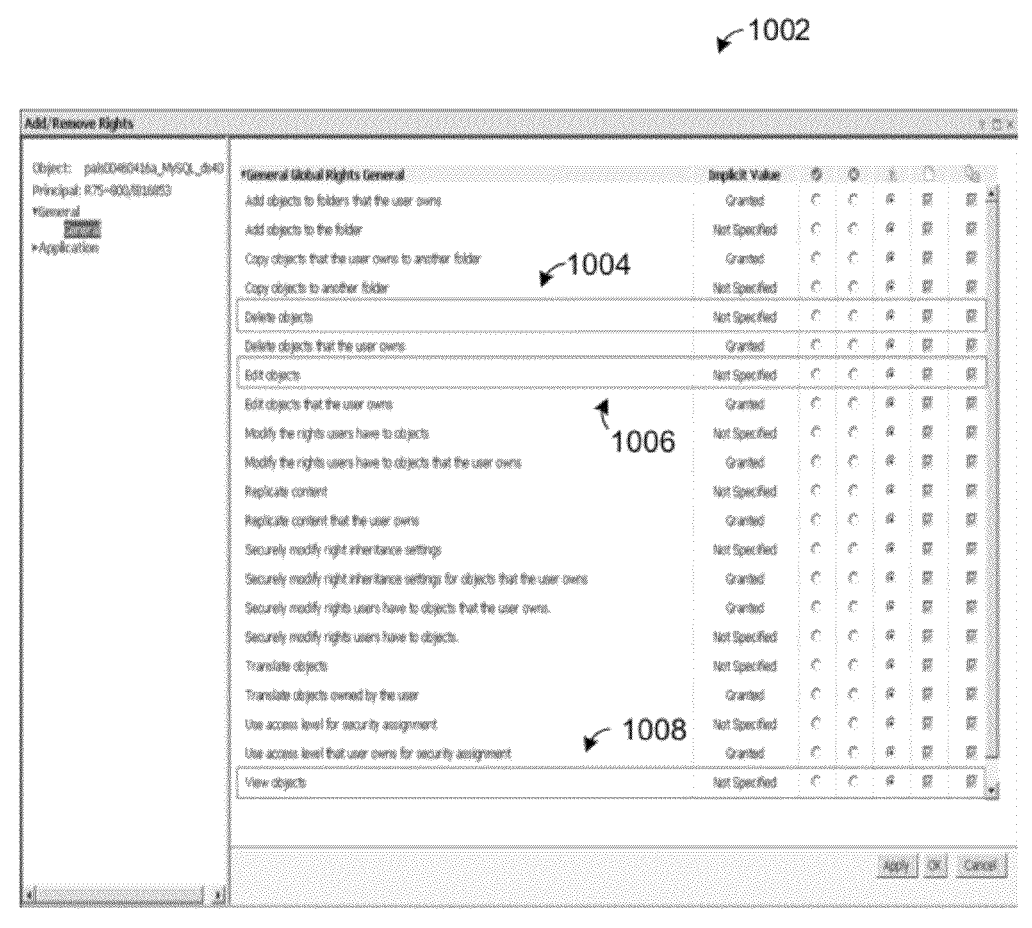

FIG. 10 is a screenshot 1002 illustrating configuration of system rights of a user. As shown in lines 1004, 1006, 1008, a user may be permitted, respectively, to delete objects, edit objects, and/or view objects. Upon granting of the "edit objects" right on a Data Services repository, a user can view, modify and delete any object in that repository. Upon granting of the "view objects" right on a Data Services repository, the user can only view any object in that repository, but can't modify or delete any object in that repository. Upon granting of the "delete objects" right on a Data Services repository, the user can only delete any object in that repository, but is not permitted to view or modify any object in that repository.

Figure 11:
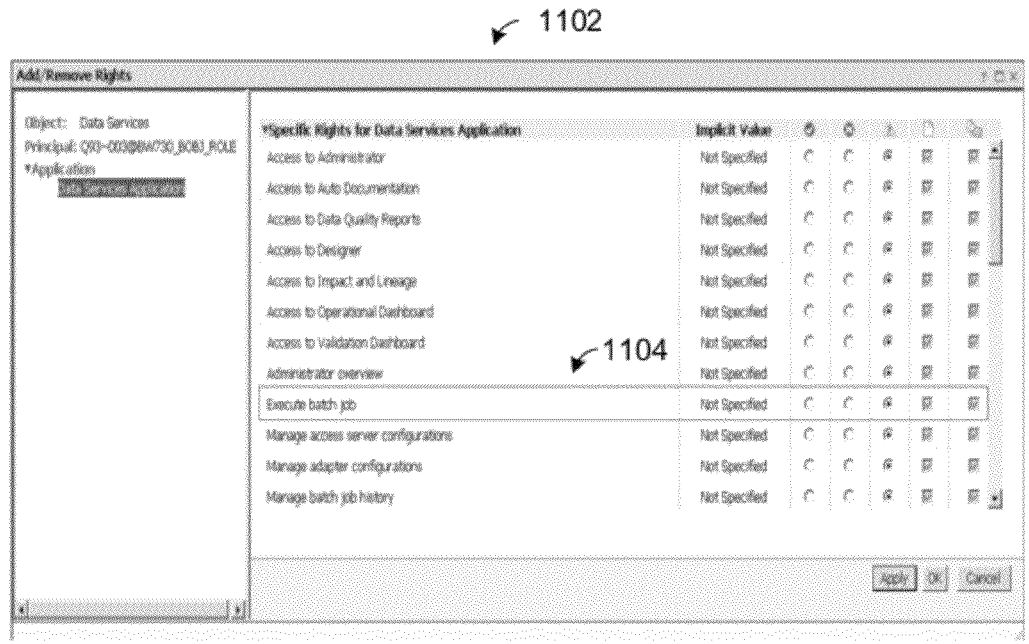
FIG. 11 is a screenshot of a screen for modifying user rights for executing batch jobs in external systems.

FIG. 11 is a screenshot 1102 illustrating an example of granting application rights related to the Data Services repository. As shown in the example of FIG. 11, the screenshot 1102 may include a number of specific rights for a given data services application. For example, as shown at line 1104, the right to execute a batch job may be granted. Upon being granted this right and any repository access right, the user can execute any job in the identified repository.

Thus, the above description and the illustrated examples of FIGS. 1-11 provide techniques for identifying a user's session in a proprietary system in an external system, e.g., using RFC JCo Server connection, and then synchronizing these two sessions, so as to thereby provide a desired type and level of access rights to individual users or groups of users.

As described, the proprietary system may thus be configured to generate a logon ticket (e.g., valid for 2 minutes) for the user's logon session at the proprietary system. Then, e.g., using a RFC JCo Server Connection, the logon ticket may be delivered to an authentication system, e.g., the BOE authentication service. In addition to the logon ticket, the JCo Server connection also may provide the user's session unique connectionID.

The authentication system may thus use the user's logon ticket and connection information to logon to the proprietary system, to thereby verify the user's identity. If the user's identification is valid, then the authentication system may identify the use in its system, using the user's logonID that previously obtained from the proprietary system (e.g., by running SUSR_CHECK_LOGON_DATA under user's previously established logon session. Upon identification of the user's identity, the authentication system may create a user's session in its environment, and associate the session with a session at the JCo Server 114.

Then, as referenced above, the user's session in the Data Services system 404 may be synchronized with the user's session in the Business Warehouse 402. Specifically, subsequent requests from the user's session in the Business Warehouse system 402 may be identified using a unique ID specifying the JCoServer 114 and JCo server context, together with the connection attributes and ConversationID. This unique ID enables the Data Services system to associate with the user's session in the Business Warehouse system 402 with the user's session in the Data Services system 404.

Then, the Data services system 402 user's session may be used to control the access control to local resources, based on Access Control List (ACL) that is administrator-configured for user. As referenced above, the user may be identified by the Data Services system 404 using the user's logon ID that is created in the Business Warehouse system 402, assuming that the relevant user logonIDs were previously imported to build the ACL 109.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An external system comprising:
   at least one processor;
   a non-transitory computer readable medium including instructions, when executed by the at least one processor, are configured to implement,
   a remote function call (RFC) server configured to create and maintain a connection between the external system and a proprietary system such that information can be exchanged between the external system and the proprietary system;
   a request handler configured to cause the at least one processor to receive, at the external system, a logon ticket from the proprietary system, the logon ticket associated with a request from a user of the proprietary system for access to the external system, the external system providing at least one functionality not provided by the proprietary system, the logon ticket including information that identifies a first user session associated with the proprietary system, the first user session indicating that the user has been successfully logged-in with respect to the proprietary system;
   a ticket handler configured to cause the at least one processor to provide the logon ticket to an authentication service to perform a validation of the logon ticket at the proprietary system;
   a session manager configured to cause the at least one processor to receive, from the authentication service, a second user session and access rights related to the requested access in response to the validation, the second user session being associated with the external system, the session manager configured to synchronize the second user session associated with the external system with the first user session associated with the proprietary system such the first user session and the second user session are concurrently valid;
   an access control list configured to store information defining levels of access rights of users including the user of the proprietary system; and
   an access control manager configured to cause the at least one processor to interact with the access control list to provide a level of access for the user for utilizing the at least one functionality of the external system in conjunction with the proprietary system within the synchronized user sessions.

2. The system of claim 1, wherein the request handler is configured to secure the connection by which the logon ticket is received from the proprietary system.

3. The system of claim 2, wherein the request handler is configured to secure the connection using a secure network communications protocol.

4. The system of claim 1, wherein the request handler is configured to receive, in conjunction with the logon ticket, a connection identifier (ID) uniquely identifying the first user session within the proprietary system.

5. The system of claim 1, wherein the validation includes logging in to the proprietary system using the logon ticket.

6. The system of claim 1, wherein the authentication service includes imported user roles associated with access to the external system, as well as users of the proprietary system associated with the roles.

7. The system of claim 1, wherein the access control list defines the levels of access rights in terms of user roles.

8. The system of claim 1, wherein the authentication service is included in a service-oriented architecture (SOA) platform.

9. The system of claim 1, wherein the logon ticket includes a single sign on (SSO) ticket.

10. The system of claim 1, wherein the session manager is configured to cache the second user session to thereby maintain the second user session beyond a duration of the logon ticket.

11. The system of claim 1, further comprising:
    a connector configured to provide compatibility between the proprietary system and operations associated with the external service.

12. The system of claim 1, wherein the synchronized first and second user sessions are concurrently valid until such time that the user of the proprietary system logs out of the proprietary system or otherwise loses connection between the proprietary system and the external system.

13. A computer program product, the computer program product being tangibly embodied on a non-transitory computer-readable storage medium and comprising instructions that, when executed, are configured to:
    create and maintain, by a remote function call (RFC) server, a connection between an external system and a proprietary system such that information can be exchanged between the external system and the proprietary system;
    receive, at the external system, a logon ticket from the proprietary system, the external system providing at least one functionality not provided by the proprietary system, the logon ticket associated with a request from a user of the proprietary system for access to the external system, the logon ticket including information that identifies a first user session associated with the proprietary system, the first user session indicating that the user has been successfully logged-in with respect to the proprietary system;
    provide the logon ticket to an authentication service to perform a validation of the logon ticket at the proprietary system;
    receive, from the authentication service, a second user session and access rights related to the requested access in response to the validation, the second user session being associated with the external system;
    synchronize the second user session associated with the external system with the first user session associated with the proprietary system such that the first user session and the second user session are currently valid;

receive, from an access control list, information defining levels of access rights of users including the user of the proprietary system; and interact with the access control list to provide a level of access for the user for utilizing the at least one functionality of the external system in conjunction with the proprietary system within the synchronized user sessions.

14. The computer program product of claim 13, wherein the connection by which the logon ticket is received from the proprietary system is secured.

15. The computer program product of claim 13, wherein, in conjunction with the logon ticket, a connection identifier (ID) uniquely identifying the first user session of the user within the proprietary system is received at the external system.

16. The computer program product of claim 13, wherein the validation includes logging in to the proprietary system using the logon ticket.

17. The computer program product of claim 13, wherein the authentication service includes imported user roles associated with access to the external system, as well as users of the proprietary system associated with the roles.

18. A computer-implemented method comprising:
creating and maintaining, by a remote function call (RFC) server, a connection between an external system and a proprietary system such that information can be exchanged between the external system and the proprietary system;

receiving, at the external system, a logon ticket from the proprietary system, the external system providing at least one functionality not provided by the proprietary system, the logon ticket associated with a request from a user of the proprietary system for access to the external system;

providing the logon ticket to an authentication service which is configured to perform a validation of the logon ticket at the proprietary system, the logon ticket including information that identifies a first user session associated with the proprietary system, the first user session indicating that the user has been successfully logged-in with respect to the proprietary system;

receiving, from the authentication service, a second user session and access rights related to the requested access in response to the validation, the second user session being associated with the external system;

synchronizing the second user session associated with the external system with the first user session associated with the proprietary system such that the first user session and the second user session are concurrently valid;

receiving, from an access control list, information defining levels of access rights of users including the user of the proprietary system; and interacting with the access control list to provide a level of access for the user for utilizing the at least one functionality of the external system in conjunction with the proprietary system within the synchronized user sessions.

19. The method of claim 18, wherein, in conjunction with the logon ticket, a connection identifier (ID) uniquely identifying the second user session of the user within the proprietary system is received at the external system.

20. The method of claim 18, wherein the validation includes logging in to the proprietary system using the logon ticket.

* * * * *